(12) United States Patent
Zink et al.

(10) Patent No.: US 8,092,132 B2
(45) Date of Patent: Jan. 10, 2012

(54) FASTENER WITH ANTI-ROTATION CLIP

(75) Inventors: Frederick E. Zink, Capac, MI (US); James Moore, Bloomfield Hills, MI (US); Jeffrey L. Gerstenberger, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 455 days.

(21) Appl. No.: 12/315,846

(22) Filed: Dec. 5, 2008

(65) Prior Publication Data

US 2010/0143065 A1    Jun. 10, 2010

(51) Int. Cl.
*F16B 39/04* (2006.01)

(52) U.S. Cl. ........................... 411/221; 411/198

(58) Field of Classification Search ............... 411/191, 411/197, 198, 202, 204, 209, 217, 221
See application file for complete search history.

(56) References Cited

U.S. PATENT DOCUMENTS

| | | | | |
|---|---|---|---|---|
| 689,073 | A | * | 12/1901 | Ferguson .................. 411/221 |
| 925,067 | A | * | 6/1909 | Zeese ........................ 411/221 |
| 950,071 | A | | 2/1910 | Luckey |
| 1,175,148 | A | * | 3/1916 | Hyde .......................... 411/293 |
| 1,176,718 | A | * | 3/1916 | Phillips ....................... 411/198 |
| 1,199,548 | A | | 9/1916 | Hedderwick |
| 1,208,350 | A | * | 12/1916 | Moore ......................... 411/198 |
| 1,317,567 | A | * | 9/1919 | Fewster ...................... 411/198 |
| 1,328,443 | A | | 1/1920 | Marburger et al. |
| 1,338,862 | A | | 5/1920 | Gorr |
| 1,440,938 | A | | 1/1923 | Sieroslawski |
| 1,448,178 | A | | 3/1923 | Andrix |
| 1,491,163 | A | | 4/1924 | Osenkowski |
| 2,084,985 | A | | 6/1937 | Bill |
| 2,405,424 | A | | 8/1946 | Herreshoff |
| 2,443,614 | A | | 6/1948 | Gray |
| 3,253,630 | A | * | 5/1966 | Phelan ........................ 411/197 |
| 3,382,905 | A | | 5/1968 | Gutshall |
| 3,622,185 | A | * | 11/1971 | Rosan et al. ................. 403/316 |
| 3,844,323 | A | | 10/1974 | Anderson, Jr. |
| 4,084,630 | A | | 4/1978 | Lewis |
| 4,090,545 | A | | 5/1978 | Ritter, Jr. |
| 4,737,058 | A | | 4/1988 | Callman et al. |

(Continued)

OTHER PUBLICATIONS

Written Opinion of the International Searching Authority for International Application No. PCT/US2009/061870, dated Jun. 7, 2011.

(Continued)

*Primary Examiner* — Flemming Saether
(74) *Attorney, Agent, or Firm* — Harness, Dickey & Pierce, P.L.C.

(57) ABSTRACT

A fastener with a threaded nut, a clip, a first engagement feature and a second engagement feature. The nut has front and rear surfaces and a first lock structure that is disposed between the front and rear surfaces. The clip has a body, which defines an aperture, a second lock structure and an engagement member. The second lock structure is coupled to the body and engages the first lock structure to axially retain the clip to the nut. The engagement member extends into the aperture in the body. The first engagement feature is coupled to either the nut or the clip and comprises at least one tooth. The second engagement feature is associated with the other one of the nut and the clip and is engaged with the first engagement feature to inhibit rotation between the nut and the clip.

20 Claims, 5 Drawing Sheets

U.S. PATENT DOCUMENTS

| | | | |
|---|---|---|---|
| 4,812,094 A | 3/1989 | Grube |
| 5,080,544 A | 1/1992 | Bruyére |
| 5,085,548 A | 2/1992 | Moyles |
| 5,395,192 A | 3/1995 | Bennett |
| 5,597,278 A | 1/1997 | Peterkort |
| 5,618,143 A | 4/1997 | Cronin, II et al. |
| 5,674,034 A | 10/1997 | Bennett |
| 5,772,373 A | 6/1998 | Cronin, II et al. |
| 5,788,399 A | 8/1998 | Smearsoll |
| 5,795,037 A | 8/1998 | Hagelthorn |
| 6,010,290 A | 1/2000 | Slesinski et al. |
| 6,095,735 A | 8/2000 | Weinstein et al. |
| 6,224,167 B1 | 5/2001 | Riley |
| 6,290,442 B1 | 9/2001 | Peterkort |
| 6,322,306 B1 | 11/2001 | Dutton |
| 6,851,904 B2 | 2/2005 | Parker et al. |
| 6,862,927 B2 | 3/2005 | Craig et al. |
| 6,896,463 B2 | 5/2005 | Tuthill |
| 6,976,816 B2 | 12/2005 | Slesinski et al. |
| 6,994,500 B2 | 2/2006 | Ward et al. |
| 7,066,700 B2 | 6/2006 | Ward et al. |
| 7,112,024 B2 | 9/2006 | Ward et al. |
| 7,112,025 B2 | 9/2006 | Ward et al. |
| 7,210,368 B2 | 5/2007 | Odenthal et al. |
| 7,258,518 B2 | 8/2007 | Ward et al. |
| 7,419,344 B2 | 9/2008 | Ward et al. |
| 7,591,623 B2 | 9/2009 | Parker |
| 2004/0146376 A1 | 7/2004 | Ward et al. |
| 2004/0258503 A1 | 12/2004 | Tuthill |
| 2007/0211973 A1 | 9/2007 | Rode |
| 2007/0215032 A1 | 9/2007 | Melberg et al. |

OTHER PUBLICATIONS

International Search Report for International Application No. PCT/US2009/061870, dated Jun. 14, 2010.

\* cited by examiner

FASTENER WITH ANTI-ROTATION CLIP

INTRODUCTION

The present invention generally relates to a fastener with an anti-rotation clip.

Locking fasteners have long been utilized for preventing anti-rotation of a nut relative to a threaded shaft. In a typical conventional construction, the threaded shaft is provided with an axial groove or keyway and a locking member, which has an inwardly extending key, is engaged to both the shaft and the nut. The locking member is adapted to extend over a threaded portion of the shaft to prevent relative rotation between the locking member and the shaft. The locking member is also provided with a means for fixedly engaging the nut to prevent the nut from turning relative to the locking member. One such arrangement is disclosed in U.S. Pat. No. 6,896,463. While such locking fasteners work for their intended purpose, an improved fastener that is less expensive, easier to assemble and more secure is desired.

SUMMARY

This section provides a general summary of some aspects of the present disclosure and is not a comprehensive listing or detailing of either the full scope of the disclosure or all of the features described therein.

In one form, the present teachings provide a fastener that includes an internally threaded nut, a clip, a first engagement feature and a second engagement feature. The nut has a front surface, a rear surface and a first lock structure that is disposed between the front and rear surfaces. The clip has a body, which defines an internal aperture, a second lock structure and an engagement member. The second lock structure is coupled to the body and engages the first lock structure to axially retain the clip to the nut. The engagement member extends into the internal aperture in the body and is adapted to be received into a keyway in a shaft to inhibit rotation between the clip and the shaft. The first engagement feature is coupled to one of the nut and the clip and comprises at least one tooth. The second engagement feature is associated with the other one of the nut and the clip and is engaged with the first engagement feature to thereby inhibit relative rotation between the nut and the clip.

In another form, the present teachings provide a fastener that includes a first structure and a second structure. The first structure defines an internally threaded aperture and has a front surface, a rear surface, a frusto-conical surface, a lock structure and a plurality of teeth. The lock structure is disposed between the front and rear surfaces and the frusto-conical surface is disposed forwardly of the lock structure. The teeth are integrally formed with a remainder of the first structure. The teeth are located on the first structure on a side of the lock structure opposite the rear surface and extend in a direction away from the rear surface. The second structure has a body, a plurality of spring tabs, an engagement member and an engagement feature. The body defines an internal aperture. The spring tabs are engaged to the lock structure to axially retain the second structure to the first structure. The engagement member extends into the internally threaded aperture and is adapted to be received into a keyway in a shaft to inhibit rotation between the clip and the shaft. The engagement feature is engaged with the teeth on the first structure to inhibit relative rotation between the first and second structures. The frusto-conical surface is configured to urge the plurality of spring tabs radially outwardly as the second structure is pushed onto the first structure.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
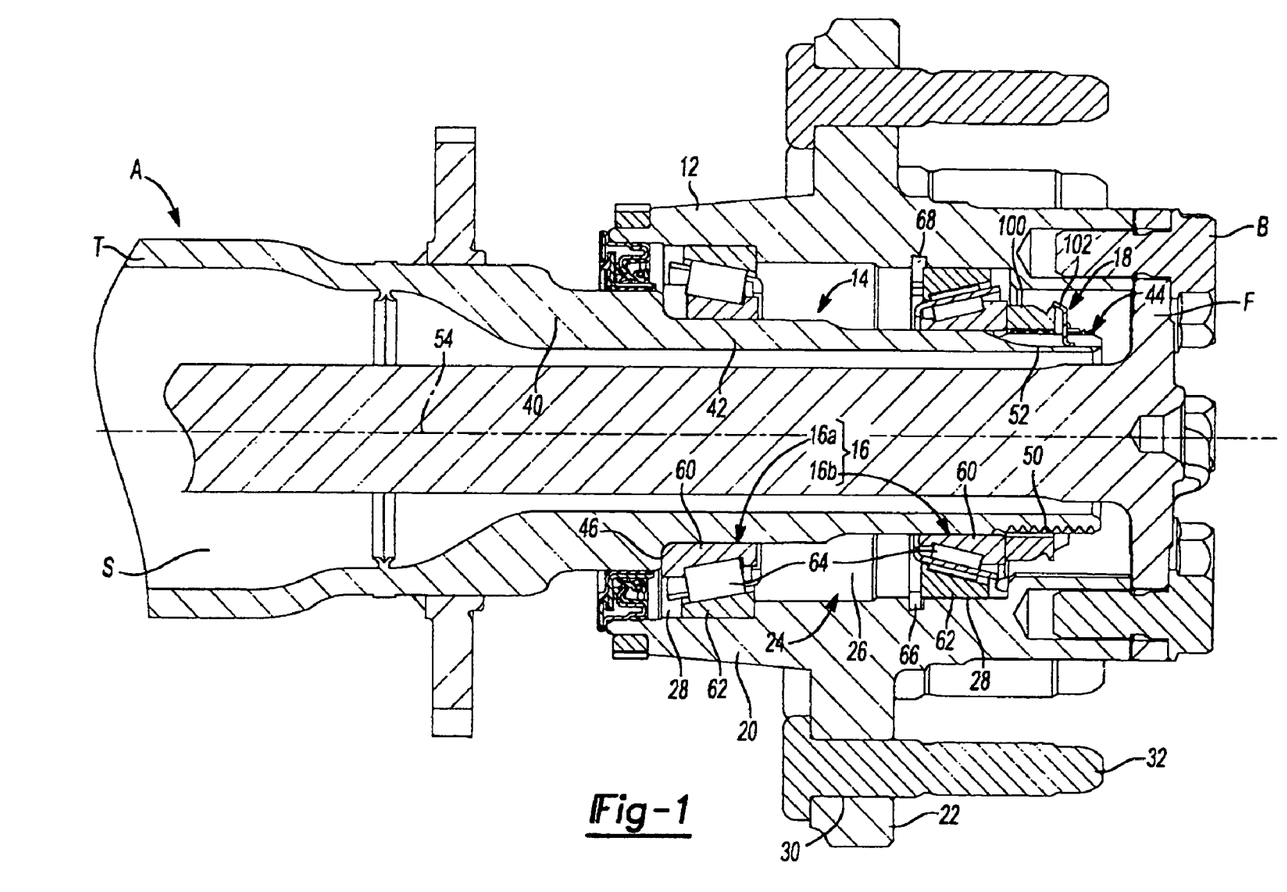
FIG. 1 is a longitudinal section view of a portion of a spindle assembly having a fastener constructed in accordance with the teachings of the present disclosure.

With reference to FIG. 1 of the drawings, a spindle assembly 10 is illustrated to include a fastener 18 constructed in accordance with the teachings of the present invention. In the particular example provided, the spindle assembly 10 is associated with a full-floating axle assembly A having an axle tube T and an axle shaft S that is rotatably disposed within the axle tube T. The spindle assembly 10 also includes a wheel hub 12, which is configured to rotatably support a driven wheel (not shown), a spindle 14, which can be formed on the axle tube T, and a bearing set 16. In the illustrated example, the axle shaft S includes a flange F that is secured to the wheel hub 12 via a plurality of bolts B. It will be appreciated, however, that the fastener 18 can be employed with other shafts and/or spindle assemblies and as such, the scope of the disclosure and appended claims is not limited to wheel hub spindle assemblies or to a wheel hub spindle assembly for a full-floating axle assembly.

The wheel hub 12 can be configured in a conventional and well known manner and need not be discussed in significant detail herein. Briefly, the wheel hub 12 can include a body 20 and a flange 22 that can extend radially outwardly from the body 20. The body 20 can define a spindle aperture 24 that can have a main portion 26 and a pair of counterbores 28 that can be adjacent to the main portion 26. The flange 22 can include a means for mounting the driven wheel (not shown), such as a plurality of circumferentially spaced apart holes 30 that can be configured to receive threaded studs 32 or bolts (not shown).

Figure 2:
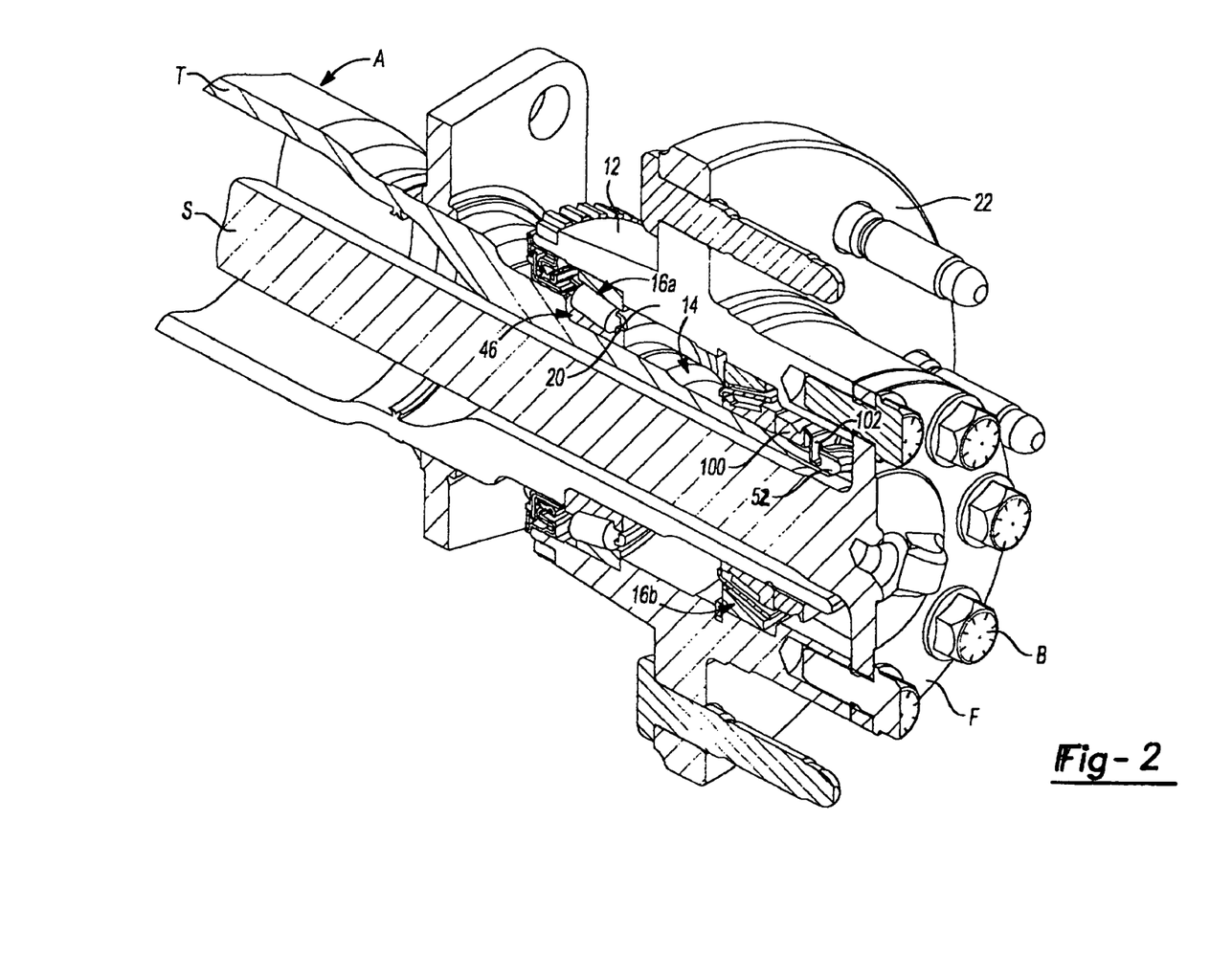
FIG. 2 is a perspective sectional view of a portion of the spindle assembly of FIG. 1 illustrating the spindle in more detail.
Figures 3, 4, 5:
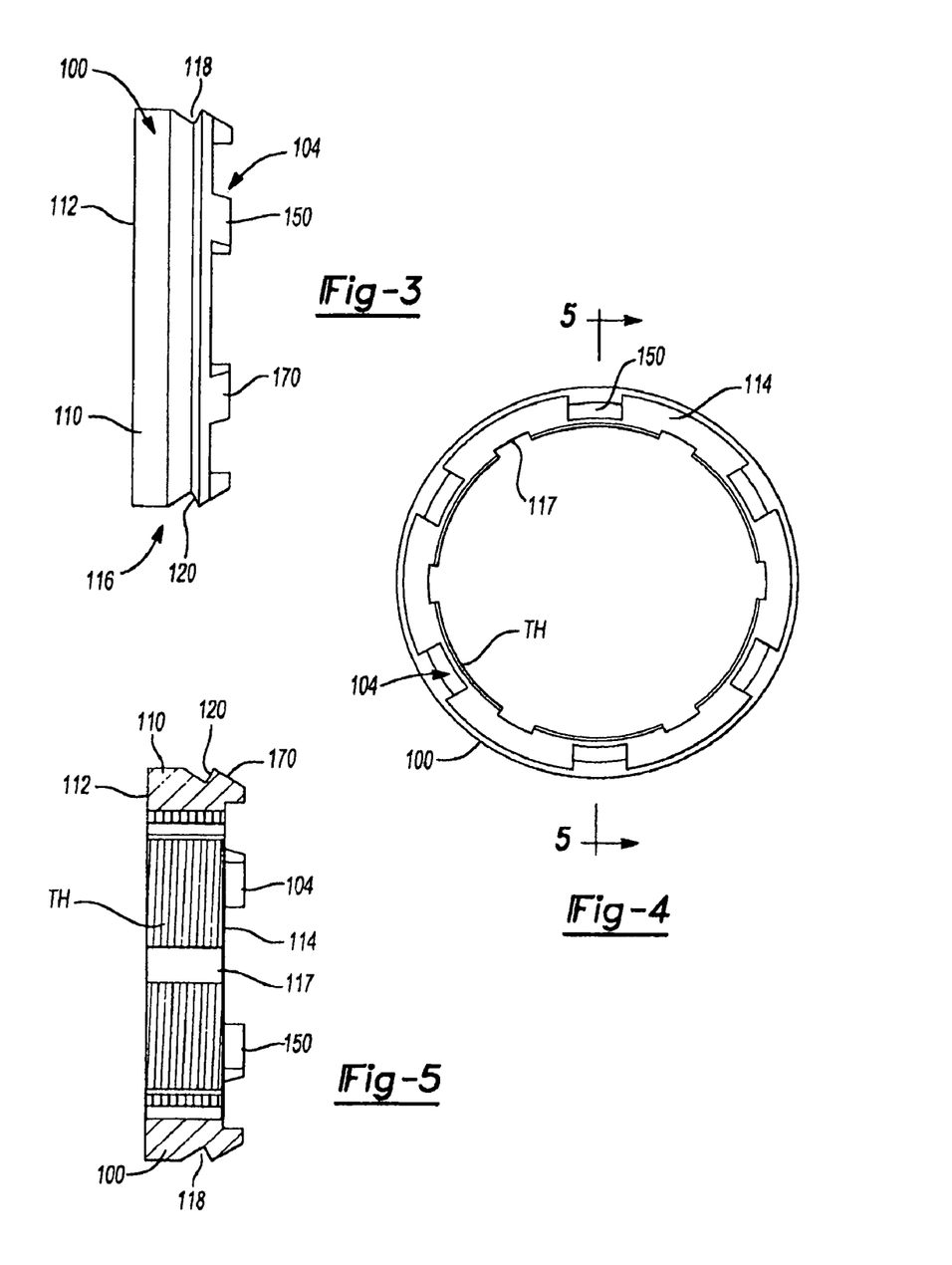
FIG. 3 is a side view of a portion of the fastener illustrating the hub member and first engagement feature in more detail.
FIG. 4 is a front end view of the portion of the fastener illustrated in FIG. 3.
FIG. 5 is a sectional view taken along the line 5-5 of FIG. 4.

With reference to FIGS. 1 and 2, the spindle 14 can also be configured in a conventional and well known manner and need not be discussed in significant detail herein. Briefly, the spindle 14 can be received into the spindle aperture 24 in the body 20 of the wheel hub 12 and can include a first shaft portion 40, a second shaft portion 42 and a third shaft portion 44. The first shaft portion 40 can be relatively larger in diameter than the second shaft portion 42 so as to form a shoulder 46 at their intersection. The second shaft portion 42 can be configured to mount the bearing set 16. The third shaft portion 44 can be coupled to an end of the second shaft portion 42 opposite the first shaft portion 40 and can include a plurality of external threads 50 and a keyway 52 that can extend generally parallel to a longitudinal axis 54 of the spindle 14.

The bearing set 16 can include a pair of bearings 16a and 16b. The bearings 16a, 16b can be conventional bearings, such as tapered roller bearings, and can include an inner race 60, which can be press-fit to the second shaft portion 42, an outer race 62, which can be press-fit into and bottomed out against the counterbores 28 in the body 20 of the wheel hub 12, and a plurality of bearing elements, e.g., rollers 64, that are disposed between the inner and outer races 60 and 62. The inner race 60 of the bearing 16a can be abutted against the shoulder 46 on the spindle 14. An internal snap ring 66 can be abutted against a side of the outer race 62 of the bearing 16b that is opposite its associated counterbore 28. The internal snap ring 66 can be received in an annular groove 68 that can be formed in the body 20 of the wheel hub 12.

With reference to FIGS. 1 and 3 through 6, the fastener 18 can comprise an internally threaded nut 100, a clip 102, a first engagement feature 104 and a second engagement feature 106. The internally threaded nut 100 can be formed of a suitable material, such as metal or powdered metal, in a suitable process (e.g., forging, casting or compacting and sintering). The internally threaded nut 100 can have a hub body 110 with a rear surface 112, a front surface 114, a first lock structure 116, a plurality of longitudinally extending grooves 117 and a plurality of internal threads TH that can be sized to be threadably engaged to the threads 50 on the third shaft portion 44 of the spindle 14. The first lock structure 116 can be disposed between the rear and front surfaces 112 and 114. In the particular example provided, the first lock structure 116 includes a circumferentially extending groove 118 that defines an abutting wall member 120. The internally threaded nut 100 can be threadably engaged to the threads 50 of the third shaft portion 44 of the spindle 14 and can be tightened to a desired degree. In some situations, it may be appropriate to tighten the internally threaded nut 100 to an extent where endplay is limited to a desired degree, while in other instances it may be desirable to tighten the internally threaded nut 100 to apply a preload of a desired magnitude to the bearings 16a, 16b. If desired washer (not shown) can be disposed between the internally threaded nut 100 and the bearing 16b.

Figure 6:
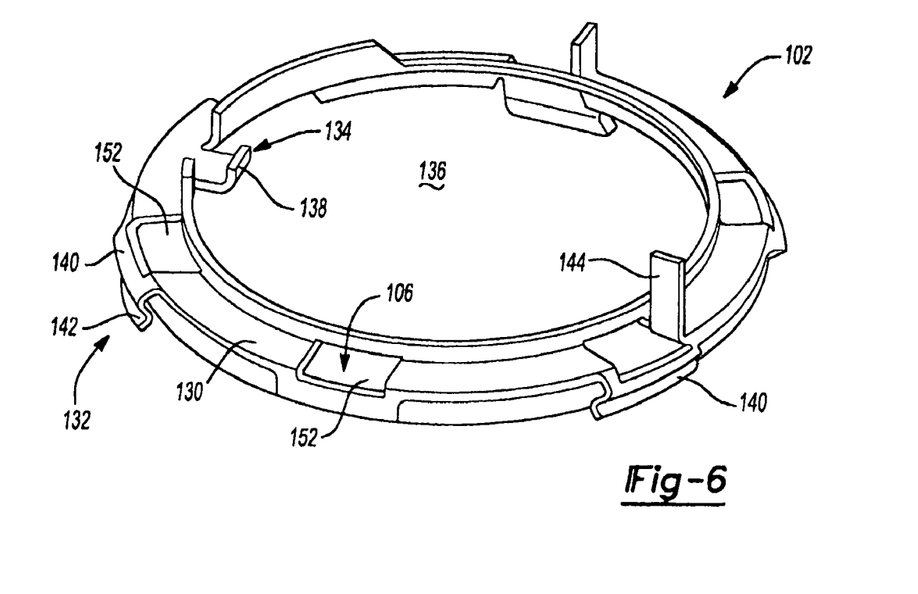
FIG. 6 is a perspective view of a portion of the fastener illustrating the clip in more detail.

The clip 102 can have a clip body 130, a second lock structure 132 and an engagement member 134. The clip body 130 can define an internal aperture 136. The second lock structure 132 can be coupled to the clip body 130 and can be configured to engage the first lock structure 116 to axially retain the clip 102 to the internally threaded nut 100. The engagement member 134 can be integrally formed with the clip body 130 and can extend into the internal aperture 136 so as to engage the keyway 52 (FIG. 2) in the third shaft portion 44 of the spindle 14 to inhibit rotation between the clip 102 and the spindle 14. For example, the engagement member 134 can comprise an L-shaped tab that can define an engagement surface 138 that can be received into the associated keyway 52 (FIG. 2). Those of skill in the art will appreciate that the engagement member 134 need not comprise a discrete tab but rather can be shaped or formed in any desired manner so as to non-rotatably engage the spindle 14. In this regard, those of skill in the art will appreciate that the keyway 52 on the spindle 14 could comprise a flat surface (e.g., the third shaft portion 44 of the spindle 14 could have a lateral cross-section that is generally D-shaped) and the internal aperture 136 could be generally D-shaped having a flat (not shown) that constitutes at least a portion of the engagement member 134.

In the particular example provided, the clip 102 is integrally formed from a suitable piece of metal, e.g., spring steel, or thermoplastic, and the second lock structure 132 comprises a plurality of spring tabs 140 that are configured to include a latch member 142 that abuts the abutting wall member 120 when the clip 102 is mounted on the internally threaded nut 100 to thereby resist removal of the clip 102 from the internally threaded nut 100 in an axial direction. One or more removal features, such as tabs 144, can be coupled to the clip body 130 to aid in removal of the clip 102 from the nut 100. In the example provided, rotation of the tabs 144 can cause the spring tabs 140 to deflect and disengage the nut 100.

Figure 7:
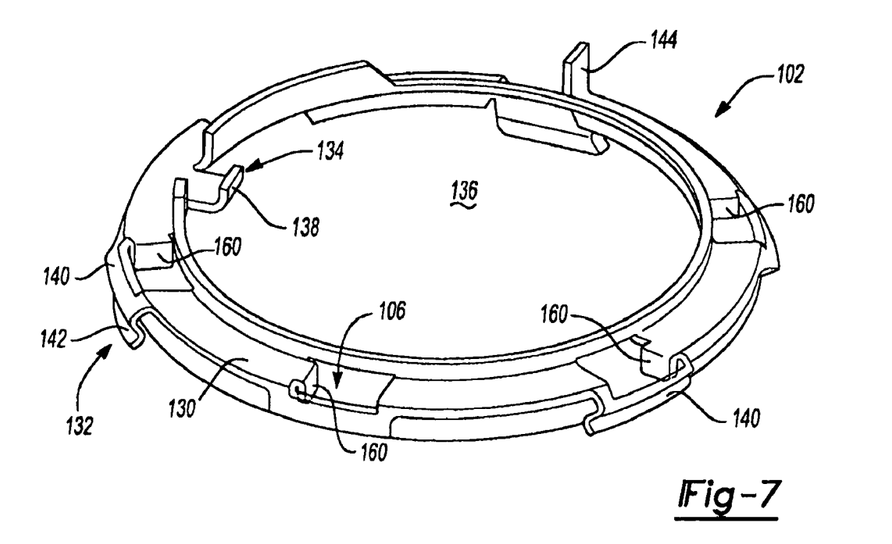
FIG. 7 is a perspective view similar to that of FIG. 6 but illustrating an alternately constructed clip.
Figures 8, 9:
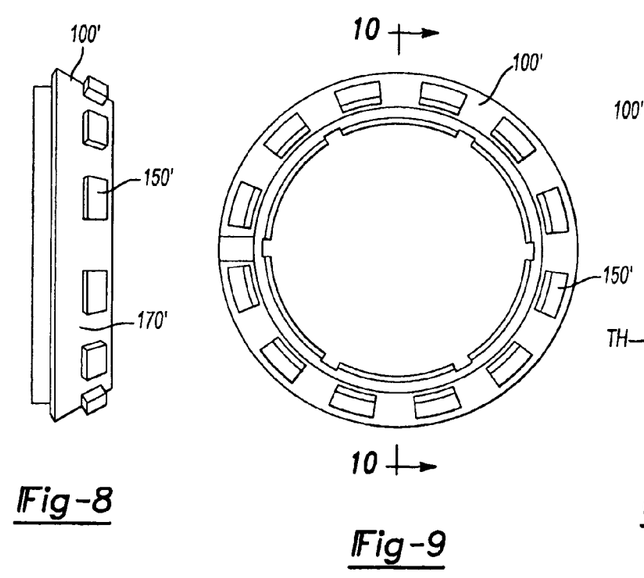
FIG. 8 is a side view of a portion of an alternately constructed fastener illustrating the hub member and the first engagement feature in more detail.
FIG. 9 is a front side view of the portion of the alternately constructed fastener illustrated in FIG. 8.
Figure 10:
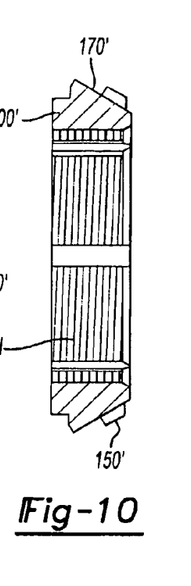
FIG. 10 is a section view taken along the line 10-10 of FIG. 9.
Figure 11:
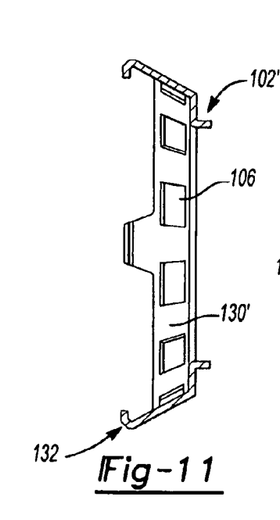
FIG. 11 is a section view taken along the line 11-11 of FIG. 12 illustrating the clip of the alternately constructed fastener.
Figure 12:
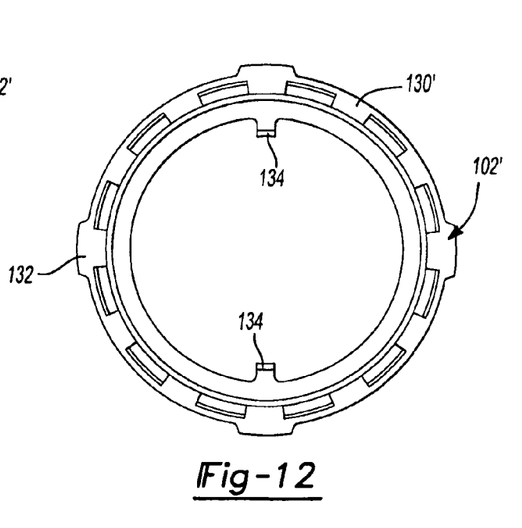
FIG. 12 is a front view of the clip of the alternately constructed fastener.

The first engagement feature 104 can be coupled to one of the internally threaded nut 100 and the clip 102 and can include at least one tooth 150. The second engagement feature 106 is associated with the other one of the internally threaded nut 100 and the clip 102 and is engaged with the first engagement feature 104 to inhibit relative rotation between the internally threaded nut 100 and the clip 102. In the particular example provided, the first engagement feature 104 comprises a plurality of teeth 150 that are coupled to the internally threaded nut 100 so as to extend from the front surface 114 thereof, while the second engagement feature 106 is associated with the clip 102 and comprises a plurality of tooth apertures 152 that are formed through the clip body 130. As one alternative, the second engagement feature 106 can comprise a plurality of mating teeth 160 that can be engaged to the at least one tooth 150 of the first engagement feature 102 as shown in FIG. 7.

Returning to FIGS. 1 and 3 through 6, a frusto-conical surface 170 can be defined by the teeth 150, or the internally threaded nut 100 or both the teeth 150 and the internally threaded nut 100; the frusto-conical surface 170 can be engaged by the spring tabs 140 as the clip 102 is urged onto the internally threaded nut 100 so as to push the spring tabs 140 radially outwardly. The spring tabs 140 can deflect radially inwardly when aligned to the circumferentially extending groove 118.

An alternatively configured fastener is illustrated in FIGS. 8 through 12. This example can be generally similar to the example of FIGS. 1 through 6, except that the frusto-conical surface 170' is wholly defined by the internally threaded nut 100', the teeth 150' extend from the frusto-conical surface 170' and the clip body 130' of the clip 102' has a frusto-conical shape that matches the frusto-conical surface 170'

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A fastener comprising:
    an internally threaded nut having a front surface, a rear surface and a first lock structure that is disposed between the front and rear surfaces;
    a clip having a body, a second lock structure and an engagement member, the body defining an internal aperture, the second lock structure being coupled to the body and engaged to the first lock structure to axially retain the clip to the internally threaded nut, the engagement member extending into the internal aperture in the body and being adapted to be received into a keyway in a shaft to inhibit rotation between the clip and the shaft;
    a first engagement feature coupled to one of the internally threaded nut and the clip, the first engagement feature comprising a plurality of circumferentially spaced teeth; and
    a second engagement feature associated with the other one of the internally threaded nut and the clip, the second engagement feature comprising a plurality of tooth apertures, the second engagement feature being engaged with the first engagement feature to thereby inhibit relative rotation between the internally threaded nut and the clip.

2. The fastener of claim 1, wherein the first lock structure comprises a circumferentially extending groove that defines an abutting wall member.

3. The fastener of claim 2, wherein the second lock structure comprises a plurality of spring tabs that abut the abutting wall member to resist removal of the clip from the internally threaded nut in an axial direction.

4. The fastener of claim 3, wherein a frusto-conical surface is formed on the internally threaded nut, the frusto-conical surface being configured to urge the plurality of spring tabs radially outwardly as the clip is pushed onto the internally threaded nut.

5. The fastener of claim 1, wherein the plurality of teeth are disposed on a frusto-conical surface of the internally threaded nut.

6. The fastener of claim 5, wherein the second engagement feature includes a plurality of tooth apertures.

7. The fastener of claim 6, wherein the second engagement feature includes a plurality of mating teeth.

8. The fastener of claim 1, wherein the plurality of teeth extend forwardly from the front surface.

9. The fastener of claim 8, wherein the plurality of teeth at least partly form a frusto-conical surface that urge the second lock structure radially outwardly as the clip is mounted onto the internally threaded nut.

10. A fastener comprising:
    a first structure defining an internally threaded aperture, the first structure having a front surface, a rear surface, a plurality of teeth, a frusto-conical surface at least partly defined by the teeth, and a lock structure disposed between the front and rear surfaces including a circumferentially extending groove that defines an abutting wall member, the frusto-conical surface being disposed forwardly of the lock structure, the teeth being integrally formed with a remainder of the first structure, the teeth being located on the first structure on a side of the lock structure opposite the rear surface and extending in a direction away from the rear surface; and
    a second structure having a body, a plurality of spring tabs, an engagement member and an engagement feature, the body defining an internal aperture, the spring tabs being urged radially outwardly by the frusto-conical surface as the second structure is pushed onto the first structure and engage the abutting wall member to axially retain the second structure to the first structure, the engagement member extending into the internally threaded aperture and being adapted to be received into a keyway in a shaft to inhibit rotation between the clip and the shaft, the engagement feature includes a plurality of tooth apertures engaged with the teeth on the first structure to thereby inhibit relative rotation between the first and second structures.

11. The fastener of claim 10, wherein the engagement feature includes a plurality of mating teeth.

12. The fastener of claim 10, wherein the teeth of the first structure extend from the frusto-conical surface.

13. The fastener of claim 12, wherein the engagement feature includes a plurality of tooth apertures.

14. The fastener of claim 12, wherein the engagement feature includes a plurality of mating teeth.

15. The fastener of claim 10, wherein the plurality of teeth extend forwardly from the front surface.

16. A locking fastener for installation on a shaft having a threaded portion and a keyway, comprising:
    a nut including an annular nut body having internal threads adapted for threaded connection to the threaded portion of the shaft, said nut body having a rear surface, a front surface, a plurality of teeth extending outwardly from said front surface, and a circumferential abutting wall member formed adjacent to said plurality of teeth between said front and rear surfaces; and
    a clip including an annular clip body adapted to surround and be non-rotatably coupled to said nut body, said clip body including a spring tab having a latch member engaging said abutting wall member when said clip is mounted on said nut, a plurality of tooth apertures within which said plurality of teeth on said nut are disposed, and an engagement member configured to extend into the keyway in the shaft.

17. The locking fastener of claim 16 wherein said plurality of teeth form a frusto-conical surface.

18. A fastener comprising:
    an internally threaded nut having a front surface, a rear surface and a first lock structure that is disposed between the front and rear surfaces;

a clip having a body, a second lock structure and an engagement member, the body defining an internal aperture, the second lock structure being coupled to the body and engaged to the first lock structure to axially retain the clip to the internally threaded nut, the engagement member extending into the internal aperture in the body and being adapted to be received into a keyway in a shaft to inhibit rotation between the clip and the shaft;

a first engagement feature including a plurality of teeth extending from the front surface of the internally threaded nut, the plurality of teeth at least partly forming a frusto-conical surface that urges the second lock structure radially outwardly as the clip is mounted on the internally threaded nut; and a second engagement feature associated with the clip and which is engageable with the first engagement feature to inhibit relative rotation between the internally threaded nut and the clip.

19. The fastener of claim 18, wherein the second engagement feature includes a plurality of tooth apertures formed in the clip.

20. A fastener comprising:

an internally threaded nut having a front surface, a rear surface and a first lock structure that is disposed between the front and rear surfaces;

a clip having a body, a second lock structure and an engagement member, the body defining an internal aperture, the second lock structure being coupled to the body and engaged to the first lock structure to axially retain the clip to the internally threaded nut, the engagement member extending into the internal aperture in the body and being adapted to be received into a keyway in a shaft to inhibit rotation between the clip and the shaft;

a first engagement feature including a plurality of teeth extending from the front surface of the internally threaded nut; and a second engagement feature including a plurality of tooth apertures formed in the clip, the teeth on the internally threaded nut being engaged with the tooth apertures to inhibit relative rotation between the internally threaded nut and the clip.

* * * * *